United States Patent Office 3,566,362
Patented Feb. 23, 1971

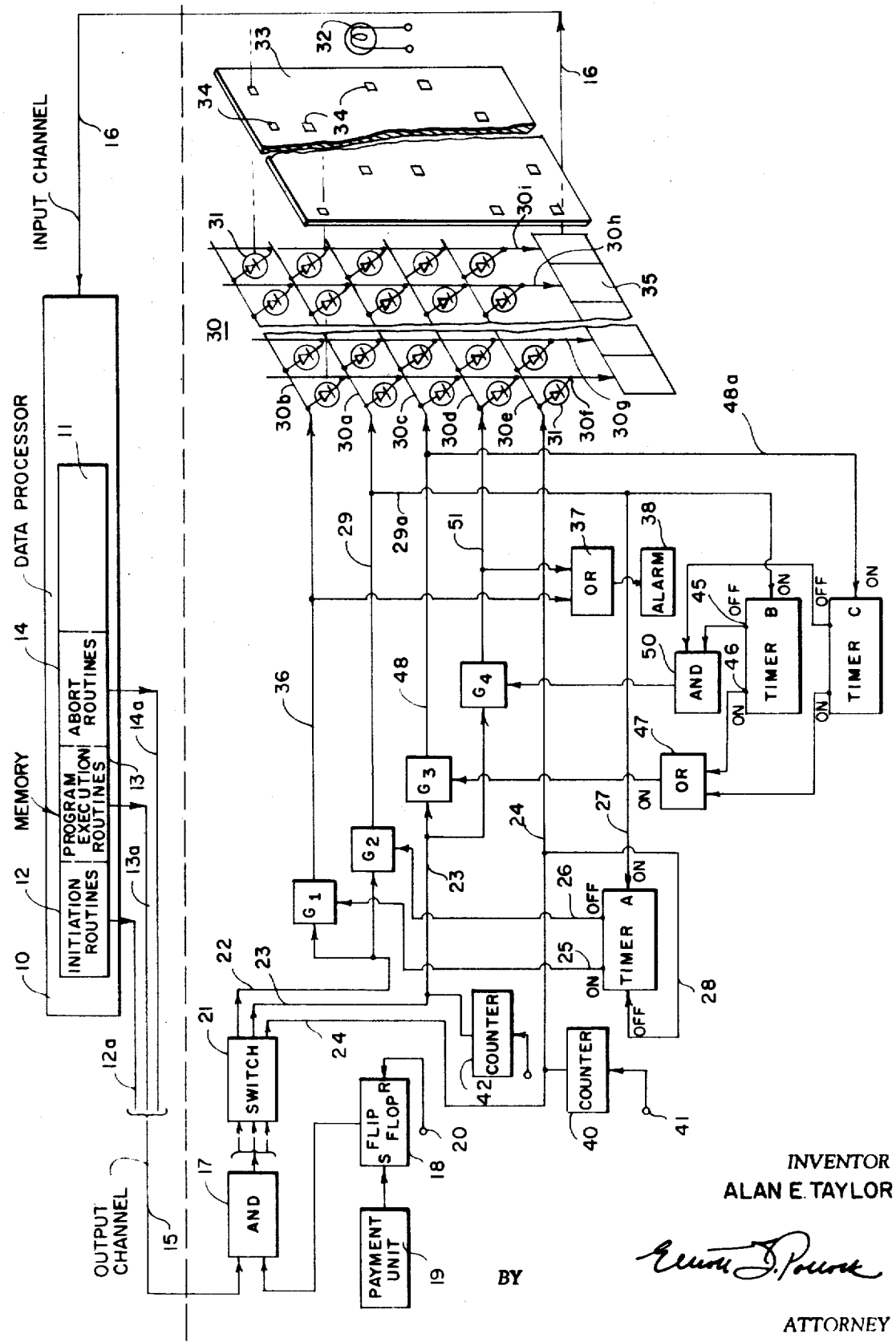

3,566,362
PROGRAM EXECUTION CONTROLLER
Alan E. Taylor, 633 Central St., Framingham
Center, Mass. 01701
Filed July 15, 1968, Ser. No. 744,775
Int. Cl. G06f 9/00
U.S. Cl. 340—172.5
10 Claims

ABSTRACT OF THE DISCLOSURE

A controller, installed as equipment separate from a main data processor, receives signals from the processor upon initiation of selected parts of the data processor program, and supplies appropriate data to the processor to permit the processor program to proceed, or to prevent the processor program from proceeding further, in dependence upon control settings previously made in the controller.

BACKGROUND OF THE INVENTION

The present invention relates to an apparatus adapted to control, and in some cases record, the operation of a program working in any particular data processor. It is more particularly concerned with apparatuses of the types described arranged to monitor the execution of various different portions of a computer program which may come into use during the processing of a quantity of data; to determine the frequency of utilization of those portions, thereby to permit knowledge to be gained upon which charges may be made to the user of the data processor for the privilege of using those parts of the program, or upon which managerial evaluation or other types of action can be made by the owner of the program, or of the data processor, or any other interested person. In particular, one of the primary purposes of the present invention is to insure that use of a program in a data processor proceeds in accordance with various rules and policies under which that program was authorized for use. The term "Data Processor" as used herein is intended to include peripherals, controllers, remote terminals, and computer networks as well as any stand-alone main data processing apparatus.

As is well known to those skilled in the art, any particular program can be executed in the data processor time and again without being intrinsically changed. As a practical matter, the value of any computer program depends in large measure upon the frequency that it is used properly, and upon the dangers incumbent upon its being used improperly. For example, a program supplied to an installation for use on that installation's payroll will be valued at, and therefore can be charged for at, a rate related to the size of such a payroll, and the frequency of the payroll run. At the present time, however, there is nothing which prevents such an installation from also using the program on other payrolls of which the owners of a payroll program have no knowledge, and for which they have received no payment. Such increased frequency of use of the program actually increases its value, but prevailing circumstances surrounding the use of programs ordinarily prevent the program owner from deriving the additional income to which he is properly entitled.

Improper use of a program may, moreover, have serious consequences going beyond the mere loss of income to the program owner. By way of example, considering once more the payroll program mentioned above, it is entirely possible under existing practices for a payroll program to be used properly during a pay period, and then, at a later date during the same pay period, to be rerun thus producing a second set of checks which could fall into unauthorized hands.

For the reasons mentioned, the use of a program and the outputs of a program, are often extremely valuable, and it is therefore important that full control over program execution be maintained by the persons responsible for that execution. Yet, notwithstanding this fact, no particular attention has been paid heretofore to controlling and safeguarding the execution of programs in data processors, and persons responsible for program execution have relied primarily upon the honesty and skill of operating personnel, together with the hindrance caused by the problems of running programs without the knowledge and servicing available only from their originators. Such reliance has in part been adequate, but on occasion it has not. It has, however, directly impacted the marketing of programs by program houses, primarily because of the difficulties attendant obtaining proper payment for program use.

The difficulties in controlling program execution at the present time arise from the general-purpose characteristics of known data processors. For example, few parts of a data processor are inaccessible to either the programmer or the processor operator, and therefore many controlling safeguards which are installed in the processor itself can be effectively bypassed by knowledgeable persons. Furthermore, in many cases, it happens that a program breaks down during execution and has to be restarted. Such restarts are normally rush operations which must take place immediately if the operations of the data processing installation are to be handled as scheduled. It has, therefore, been thought necessary to leave in the hands of processor operators full authority to start and restart programs as they deem necessary, and without necessarily making any reference to higher authority.

The apparatus of the present invention, recognizing the nature of known machines and the usual ways in which programs are written, marketed, documented, and executed, is intended to provide a new form of control for the execution of programs, or parts of programs, by data processors so that appropriate monetary charges can be made, and so that appropriate policy decisions as to the proper operation of the processor can be instituted and effectively safeguarded.

In order to appreciate the nature of the problems here involved, and solved by the present invention, let us assume that a payroll program is to be executed in a data processor. Let us further assume that the processor completes the program, prints out payroll checks, provides accounting totals, updates tapes for the next period's payroll runs, etc. The payroll operation having been completed, there is nothing under present operating procedures which prevents a programmer or an operator from reusing the program, producing more checks which can be cashed, destroying the accounting data, etc., and vanishing. This is not only possible, but there may well be no trace of its having occurred, or who did it. The present invention provides, for the first time, a means for preventing such occurrences, and further provides a tool which can control the execution of various different types of programs in accordance with desired policies established by the owner of the program or the data processor.

Perhaps the most basic purpose of the apparatus to be discussed hereinafter resides in its ability to appreciate not merely the fact that the program is, or is not, in authorized execution, but to know the extent to which it has been in execution, to determine that any necessary policy decisions which involve the method of execution are implemented, and to assure that use of the program is not accidentally, unavoidably, dishonestly, or otherwise kept from the attention of appropriate supervisory personnel, or left unentered in appropriate records. Thus, in the example of the payroll discussed above, the apparatus of the present invention has the ability to determine whether the payroll program is being reentered under authorized circumstances (e.g., because of a failure in an earlier run), and operates to permit proper reentry into the program, but inhibits improper use of the program.

In accordance with a further aspect of the present invention, the system to be described provides the owners of the program with a means, operating independently of the program, which can examine the program operations, and which can change the course of the program appropriately without necessarily involving the original programmer. In this respect, the program execution controller of the present invention can be used in conjunction with the system described in Taylor U.S. Pat. No. 3,399,298, issued Aug. 27, 1968, for "Data Processor Profitability Monitoring Apparatus." By using such a joint system, for example, if a program being executed on a business machine involves a scientific or mathematical formula which is more easily handled on a scientific machine, the composite apparatus may be set to count the number of times a particular routine (e.g., a sine routine) occurs, and if the occurrence exceeds a specific management determined frequency, the course of the program can be changed so that it is executed more efficiently on a scientific machine rather than inefficiently upon the original business machine. Indeed, by using a system of the type described, appropriate instrumentalities may be brought into play to initiate a change in the machine itself so that it becomes, temporarily, a scientific machine rather than a business machine. Such a machine which has the capability of changing its structure is the standard IC 6000 system.

In making decisions of the types described above, it is not necessary for the criteria used to be as simple as the number of times a specific routine is entered, or the length of time since the program was previously activated. In fact, any combination of factors can be used. For example, the decision to halt the operation of a scientific program on an unsuitable business machine can itself be subject to reversal if the conditions of the other programs operating upon the original business machine are such as to involve no loss to the owners even though the scientific program is executed inefficiently. Such an occasion might arise, for example, if there are no further programs waiting to be executed in the business system.

In accordance with still another aspect of the present invention, the apparatus to be described may be empolyed with known data processing programs, arranged to permit the automatic selection of a particular one of plural possible data processors for the execution of the whole or any part of a given program, so as to implement previously determined management policies.

In all of the various aspects described, the present invention is primarily characterized by the fact that it provides an apparatus which can exercise a direct control over the execution of a data processor program, with this control being exercised beyond and independent of any other controls which may be built into the program or processor.

SUMMARY OF THE INVENTION

In providing for the foregoing objects and advantages, the present invention contemplates the provision of a program execution controller adapted to sense the execution of particular parts of a program, adapted to measure various characteristics about the execution of the program, adapted to provide data to the program for use in further program operations; and adapted to assure that the program can properly proceed, or that further progress of the program be inhibited, in accordance with policy decisions which are determined by the program execution controller, and which are beyond the control of the programmer or processor operator.

In providing for these objects, and in accordance with one embodiment of the present invention, the program execution controller comprises a control mechanism which may be connected between appropriate input and output lines of a known data processor. The execution controller comprises circuit arrangements which may be variably set and/or interconnected as desired to implement various program execution policies. In a preferred embodiment of the invention, the execution controller comprises a plurality of logic components (e.g., counters, switches, gates, flip-flops, and timers) some or all of which may be interconnected to one another in various circuit configurations by means such as a plug board forming a portion of the controller. The overall controller is mounted within an appropriate housing, or is otherwise located at an appropriate place inaccessible to the processor operator, so that the policy decisions provided by the controller cannot be varied or bypassed by unauthorized personnel. The controller is, moreover, designed for use with a processor program which is expressly set up to make reference to the execution controller; and, as a result, particular programs can thus be controlled without preventing the processor from operating in otherwise normal fashion with other programs not so set up.

The program execution controller of the present invention, when used in conjunction with a processor having a program therein intended to cooperate with the controller, receives signals from the processor at the beginning of various possible program routines. These signals, indicating that an effort is being made to start a particular routine, are coupled to appropriate logic circuits in the controller which determine whether the routine should, or should not, proceed. If the execution controller determines that the routine in question can properly proceed, the controller supplies data to the processor, either in the form of a program signal or in the form of an address to previously stored program information in the processor, so as to permit that particular routine to proceed. The program execution controller, by thus supplying data needed for the program to proceed, assures that the processor cannot be used improperly, and further assures that the managerial policies implemented by the controller cannot be bypassed simply by revision of the stored program itself. In the event that the execution controller determines that a particular routine should not proceed, the controller operates to supply a different output signal which can be used for various safeguarding purposes, e.g., to remove power from the system, sound an alarm, and/or destroy program information which had previously been loaded into the data processor.

The signals thus supplied by the program execution controller, whether they be program signals or addresses, can be derived from appropriate registers forming a portion of the execution controller, and should, in such an instance, be adapted for alteration as necessary. In the alternative, and in accordance with the particular embodiment to be described hereinafter, the program or address signals can be supplied by means of an appropriate matrix adapted to cooperate with a punched card or the like, whereby the signal outputs of the execution controller can be varied by changing the control card used, thereby to permit desired changes in the managerial policies governing the operation of any given program, or to permit the controller to operate appropriately in accordance with various different programs in the processor.

BRIEF DESCRIPTION OF THE DRAWING

The drawing comprises a block diagram of a program execution controller and data processor combination, with the circuits of the execution controller set to implement specific policy decisions to be described.

DESCRIPTION OF THE PREFERRED EMBODIMENT

In accordance with the present invention a program execution controller (shown below the broken line in the drawings) is provided for controlling the execution of a stored program in a data processor 10. The data processor is, as conventional, assumed to include a memory 11 having program and operating data stored therein; and the stored program is further assumed to include information 12 relating to initiation routines, information 13 relating to program execution routines, and information 14 relating to abort or abnormal ending routines. The information 12, 13, 14 is stored in such form that the overall program can be controlled by the program execution controller of the present invention; and, to this effect, the data processor 10 and its associated memory 11 operate to provide a pulse on line 12a when the processor commences an initiation routine, a pulse on line 13a when the processor commences a program execution routine, and a pulse on line 14a when the processor commences an abort routine. The lines 12a, 13a and 14a constitute an output channel of the processor, as generally designated at 15, and this output channel is coupled to the program execution controller, to be described. In addition, the data processor 10 is provided with an input channel 16 supplied with signals from the program execution controller, for purposes which will also be described.

The particular program execution controller shown in the drawings is intended to govern three factors, i.e., program initiation, execution, and abort, in accordance with specific managerial policies to be discussed. It will be appreciated, however, that the particular factors thus governed can be varied in dependence upon the desires of supervisory personnel; and it will be further appreciated that the particular policies to be discussed hereinafter are given by way of example only, and can be varied or altered as desired. To this effect, the program execution controller is preferably constructed in the form of a plurality of logic components and/or settable means mounted within an appropriate housing, and adapted to be interconnected in various configurations by an appropriate plug board, or adapted to have their interconnections varied as desired and as necessary by means of appropriate switch mechanisms. The actual program execution controller circuit shown in the drawings is intended to depict only one such possible interconnection of components.

The signals appearing on output channel 15 are coupled to a gate 17 in the program execution controller; and said gate 17 is supplied with an additional input from flip-flop 18 when said flip-flop is appropriately set by an output signal from a coin prepayment, or credit establishing unit 19. By this particular arrangement, the owner of a program can be assured that the program cannot be initiated until the program use has been paid for or otherwise charged for. Flip-flop 18 can be reset by an appropriate signal applied to line 20, and this reset can, if desired, be effected by remote control. It will be appreciated, of course, that the payment until 17-20 forming a portion of the program execution controller constitutes optional equipment which can be added to the execution controller by a software owner to assure that proper payment is made for use of a program. This unit may be dispensed with if particular circumstances dictate that use of the program be monitored, recorded, and/or charged for in other ways.

The signals appearing on output channel 15 are coupled either directly, or via gate 17 (when gate 17 is employed), to the input of a switch unit 21. The input to switch unit 21 may constitute any one of the three signals previously described as appearing on lines 12a, 13a and 14a; and these three signal input conditions have been depicted in the drawing by three inputs to switch unit 21. The three possible inputs to switch unit 21 are distinguishable from one another, e.g., the signals appearing on lines 12a, 13a and 14a may be of different amplitude; and switch unit 21 operates to recognize occurrence of these three different signals, and to provide a signal on line 22 upon occurrence of an initiation routine signal on line 12a, to provide a signal on line 23 in response to occurrence of a program execution signal on line 13a, and to provide a signal on line 24 in response to occurrence of an abort signal on line 14a. A plurality of logic components are connected to the several lines 22, 23 and 24; and the interconnections of these logic units are made in accordance with previously determined managerial policies reflecting proper (or improper) operation of the initiation, program execution, and abort routines.

More particularly, considering first the network coupled to switch output line 22, it will be seen that a signal appearing on line 22 may be coupled to the input of either a gate $G_1$, or to the input of a different gate $G_2$. These gates $G_1$ and $G_2$ are in turn supplied with further signals from the "on" and "off" outputs 25 and 26 of a timer A. Timer A is designed to be set "on" by a signal applied to line 27 and, for reasons to be discussed, is designed to remain in its "on" state for a significant period of time (e.g., one week) whereafter it automatically reverts to its "off" state. The timer A is also designed to be forceably returned to its "off" state by a signal applied to line 28.

Timer A in the program execution controller is intended to implement a managerial policy that a payroll program (having the routines 12, 13 and 14) is not to be run more often than once a week, except when the program previously started was aborted. When timer A is "off" the execution controller interprets this condition as indicating that data processor 10 can properly initiate the payroll program. On the other hand, when timer A is "on" the program execution controller interprets this condition as indicating that, some time during the previous week, the payroll program was already initiated and should not therefore properly be reinitiated. To this effect, a signal from the initiation routine 12 appearing on line 12a and, via switch 21, on line 22 is applied to the inputs of both gates $G_1$ and $G_2$ only one of which is enabled depending upon the condition of timer A.

If timer A is "off," the signal on line 26 enables gate $G_2$; and a signal is accordingly supplied to line 29 of the program execution controller. The signal on line 29 is also coupled, via lines 29a and 27 so as to set the timer A to its "on" state for a period of one week.

The signal on line 29 is further coupled to a line 30a of a control matrix 30. Control matrix 30 comprises a plurality of lines 30a through 30e inclusive, and a still further plurality of transverse lines 30f through 30i which are insulated from lines 30a through 30e. These two groups of lines 30a–30e and 30f–30i are interconnected by rows of photoelectric diodes 31, with one such diode being located at each cross point of the matrix. The photoelectric diodes 31 are normally nonconductive, but are adapted to be rendered conductive when they are illuminated from an appropriate light source 32. Just which of the several diodes in the matrix are so illuminated is determined by a punched card or other appropriate apertured mask 33 which is positioned in overlying relation to the photoelectric diode matrix, and which is provided with apertures such as 34 disposed in appropriate patterns. The actual ones of photoelectric diodes, in any given row, which are rendered conductive depends upon just which ones of the diodes are illuminated at the time that a signal appears on one of the matrix lines 30a–30e; and upon occurrence of such a signal, the illuminated diodes operate to transfer a unique pattern of signals via lines 30f–30i to the several stages of a register 35, the output of which comprises the aforementioned line 16 acting as an input channel to data processor 10. It will be appreciated, of course, that by varying the aperture pattern in card or mask 33, e.g., by replacing one punched card with another, the actual signal output from register 35 can be similarly varied.

As mentioned, upon occurrence of a signal on line 29, a pattern of voltages will be transferred to register 35 from the illuminated diodes connected to matrix line 30a; and this pattern of voltages is then supplied to input channel 16 of data processor 10. The particular pattern of signals thus applied to the data processor operates as program information permitting the processor to proceed with the initiation routines, or, in the alternative, may comprise an address to previously stored program information in memory 11 similarly permitting the initiation routines to proceed. Without this particular pattern of pulses supplied from the program execution controller to input channel 16, the data processor cannot proceed with the program; and this assures that a skilled programmer cannot circumvent the controller function by simply preventing occurrence of a signal on line 12a.

Once the initiation routine has been properly commenced, the timer A is switched to its "on" state by the signal on line 27, and remains in that "on" state for the period of timer A, e.g., one week. If an effort should be made to recommence an initiation routine later during that one week period, while timer A is still "on," the signal appearing on line 22 will be coupled via gate $G_1$ to line 36, and thence to line 30b of matrix 30. The signal on line 36 may also be coupled via buffer 37 to an appropriate alarm device 38 which will immediately alert supervisory personnel to the fact that someone is improperly trying to initiate the payroll program. In the alternative, or additional thereto, the signal on line 36 may be used to remove power from the data processor.

The signal applied to matrix line 30b causes, by reason of the different aperture pattern in card 33 associated with said line 30b, a different pattern of voltages to be supplied to register 35 and thence to data processor input channel 16; and this different pattern of pulses can act as a programming signal or an address designed to destroy the program which had previously been loaded into the data processor. This operates as a precaution to prevent anyone from improperly gaining information regarding the program in the data processor.

In the event that the program, once properly initiated, is aborted for any reason, the execution controller implements the further policy that reinitiation of the entire program should be permitted To this effect, occurrence of an abort supplies a signal from the abort routine 14 via line 14a and thence, ultimately, to line 24; and this signal is coupled via line 28 to the "off" input terminal of timer A to reset timer A to its "off" condition. The signal on line 24 is also coupled to matrix line 30e so that an appropriate pattern of pulses may be supplied by means of register 35 and input channel 16 to permit restart of the program. The occurrence of signals on line 24 further operates a counter 40 so that an appropriate record may be maintained of the number of aborts which may have occurred over a period of time; and counter 40 can be appropriately reset by a signal applied to line 41, again, if desired, by remote control.

Once the program has been properly initiated, it proceeds to the program execution routines supplied by information 13 in the memory. Each time that a particular routine is executed, a signal appears on line 13a and, ultimately, on line 23; and these signals are counted by counter 42 which is connected to line 23. It would appear upon first consideration that the use of such a counter is unnecessary since the program in data processor 10 could, itself, be so constructed as to count such activities. However, while this is so, the program is not an adequate check on the usage of the program, since, while it can count the number of activities which occur in a specific execution, it is unable to prevent itself from being loaded in an unauthorized and unreported manner. Accordingly, the provision of counter 42 as a portion of the program execution controller assures that an appropriate count is maintained which is completely independent of control or manipulation by the data processor operator. It will be appreciated, of course, that counts of other functions may be achieved in similar manner by coupling a counter such as 42 (or 40) to any other desired line in the execution controller.

The logic network coupled to line 23 assures that the content of the program is protected while it is in execution. More particularly, the particular logic networ shown in the drawings implements the policy that a first iteration must take place within a predetermined time interval after initiation of the program, and the further policy that no iteration should take longer than a particular time interval.

Timer B takes care of the first part of this program execution policy. More particularly, once the program has been properly initiated, the signal on line 29 is coupled via line 29a to the "on" input side 45 of timer B. Timer B is thus switched to its "on" condition and will remain in this condition for a relatively short interval of time corresponding to the interval in which the first iteration must take place following initiation of the program. If the first iteration does take place during this particular interval of time, the signal on line 23 is coupled via gate $G_3$ (which is enabled by the "on" output 46 of timer B via buffer 47); and a signal is supplied on line 48 from the output of gate $G_3$ to control matrix line 30c so as to provide a unique pattern of pulses to register 35 and thence to input channel 16 to permit the first iteration to proceed.

The signal on line 48 is also coupled via line 48a to the "on" input side of a timer C; and the "on" output side of timer C is coupled via buffer 47 to gate $G_3$. The time interval of timer C is selected in accordance with the policy that no iteration should take longer than a particular time interval; and if a particular iteration is completed, and the next iteration commenced, wihin the interval of timer C, gate $G_3$ will still be enabled so as to permit the program execution routines to proceed in the manner described.

In the event that a program execution routine signal appears on line 23 at a time when both timer B and timer C are in their "off" conditions, gate $G_3$ will not be enabled and, instead, gate $G_4$ will be enabled by means of a signal applied from the "off" sides of timers B and C to gate 50. In these circumstances, the program execution routine signal on line 23 will be coupled via gate $G_4$ to line 51. This will, in turn, supply a signal via buffer 37 to alarm 38 for reasons similar to those previously described; and will, at the same time, supply a signal to line 30d of the control matrix 30, whereby register 35 will supply a different pattern of pulses to processor input channel 16 operative to destroy the program.

It will be appreciated, of course, that the several program signals or addresses supplied by the program execution controller can be supplied by registers forming a portion of the controller rather than by means of the matrix arrangement shown in the drawings. However the matrix arrangement does have the advantage of permitting ready changes in the patterns of signals supplied to channel 16 through the simple expedient of replacing one card 33 with a differently punched card. This further permits the controller to be used with a variety of different programs in the data processor, and also permits ready alteration in the contol functions which are to be achieved during the operation of any given program depending upon changes in managerial policy associated with that program.

Various different parts of known programs can be sensed in the fashion described, and various different factors can be evaluated and/or recorded during the sensing operation. By way of example, certain parts of a computer program whose execution can be sensed by the equipment of the present invention include program routine, library and macroe instruction entries initialization procedures, execution of loops, execution of error procedures and aborts, calls to libraries, execution of monthly, annual or other unusual procedures, compilations, input/output instructions, calls to other data processors, activation of remote consoles or controllers, and receipt of calls from other data processors, data processing programs, remotes or controllers. Nor is it necessary for the purposes of the present invention that the sensing be confined to direct action of the program itself. For example, means can be provided for monitoring physical characteristics of the processor input-output units (e.g., a physical code on a reel, identifying the particular program on that reel, or identifying the particular reel of a number of reels which may be used in sequence); and the results of such monitoring can be used by the program controller in the same way as the other inputs would be, i.e., to implement the policies which are to be followed during execution of a computer program. The actual physical parts of a computer memory which can be sensed in a manner similar to that described include the core stacks, the core drivers, the disc buffers and disc tracks, the drum buffers, the address-extraction apparatus, the internal buses, the instruction-extraction apparatus, and the console displays.

It should also be noted that, since the program execution controller of the present invention comprises, in large part, components which already exist in conventional data processing equipment (e.g., counters, gates, timers, etc.), the control arrangements may utilize components which already exist in these processors. In such a case, a control program can be written to utilize such preexisting components. Some rewiring may be needed to provide the necessary inputs of the various counters, gates, etc.; but in general such rewiring would be minimal. The program written to permit such utilization of preexisting components would, in effect, cause such preexisting processor components to have dual functions during different time intervals. For example, an appropriate program could be written stating, in effect, that at certain times when a particular counter was not otherwise occupied, it can function as a controller counter or register.

Actually, such use of preexisting computer components for controlling program execution is often less than desirable, and it is therefore preferred that the program execution controller take the form of a separate piece of hardware as has already been described. More particularly, it will be appreciated that by utilizing certain preexisting components in the processor 10 to handle the control of program execution, one may, at the same time, lose the independence of the operational control from the programmers and/or the data processor operators, thus risking some of the various reasons for providing the execution controller.

The control functions described may, if desired, be supplemented by recording, transmitting and receiving equipment adapted to give permanent or temporary records of events involved in the program execution, either at the data processor itself or at a remote point, so that fullest control of the program execution can be maintained and records of the events involved can be maintained wherever desired. Such recordings may be used, for example, to identify persons initiating programs, whether or not the programs were being initiated properly, or could be used to identify persons who are utilizing programs in an undesirable or inefficient manner. The recording means employed may include automatic cameras, facsimile machines, read-outs of various parts of the computer memory, etc. Data transmission and receiving apparatus, such as common carrier lines, microwave facilities, etc., can also be utilized to report events occurring in the data processor installation to a remote site, e.g., the headquarters of the firm or person who owns and/or licenses the software which is being executed. This enables the owner of the software to maintain absolute control of its operations, and to prevent any breach of its proper use.

While I have thus described a preferred embodiment of the present invention, many variations will be suggested to those skilled in the art, and certain of these variations have already been described. It must therefore be understood that the foregoing description is intended to be illustrative only and not limitative of my invention; and all such variations and modifications as are in accord with the principles described are meant to fall within the scope of the appended claims.

Having thus described my invention, I claim:

1. In combination, a data processor normally operable to perform properly a predetermined program routine and comprising means providing a sensible manifestation in response to commencement of said predetermined program routine in said data processor, program execution controller means inaccessible to an operator of said data processor for imposing restrictions on the performance of program routines by said operator, said execution controller means including settable means establishing managerial policy criteria for authorizing whether said program routine may be performed, means responsive to commencement of said program routine and resultant occurrence of said sensible manifestation for coupling a signal to said execution controller means, and control means in said execution controller means jointly responsive to occurrence of said signal and to the operating condition of said settable means for controlling whether or not execution of said commenced program routine should be permitted to proceed in said data processor.

2. The combination of claim 1 wherein said execution controller means includes means for selectively producing any one of a plurality of different program control signals, said control means being jointly responsive to occurrence of said sensible manifestation signal and to a first operating condition of said settable means for producing a first program control signal, and being jointly responsive to occurrence of said sensible manifestation signal and to a second operating condition of said settable means for producing a second program control signal different from said first program control signal, and means coupling the program control signal produced in said execution controller means to said data processor.

3. The combination of claim 2 including alarm means operable upon production of a predetermined one of said first and second control signals.

4. The combination of claim 2 wherein said means for producing said different program control signals comprises a switching matrix, and means for selectively rendering different portions of said matrix operative.

5. The combination of claim 4 wherein said matrix includes a plurality of photosensitive elements, a light source, and apertured mask means disposed between said light source and said photosensitive elements.

6. The combination of claim 1 wherein said settable means includes a timing device.

7. The combination of claim 1 wherein said settable means includes a plurality of gates, and means for enabling selected ones of said gates.

8. The combination of claim 1 wherein said settable means includes monetary payment means for authorizing execution of a program only after proper payment has been made for use of the program.

9. The combination of claim 1 wherein said data processor includes means for providing a plurality of distinct sensible manifestations corresponding respectively to commencement of different program routines in said data processor, said program execution controller means including a plurality of said settable means individually settable to establish different managerial policy criteria for the performance of said different program routines, and switching means responsive to occurrence of different ones of said distinct sensible manifestations for rendering different ones of said settable means operative to control the performance of said different routines respectively.

10. The combination of claim 1 including counter means in said execution controller inaccessible an an operator of said data process for counting the number of times said routine is commenced.

References Cited

UNITED STATES PATENTS

| | | | |
|---|---|---|---|
| 3,286,236 | 11/1966 | Logan et al. | 340—172.5 |
| 3,303,474 | 2/1967 | Moore et al. | 340—172.5 |
| 3,421,150 | 1/1969 | Quosig et al. | 340—172.5 |

OTHER REFERENCES

Reference Manual, IBM 7080 Data Processing System, 1960, pp. 91–92.

Pung et al.: Program Instruction Time Down Device, IBM Technical Disclosure Bulletin, vol. 7, No. 5, October 1964.

PAUL J. HENON, Primary Examiner

S. CHIRLIN, Assistant Examiner